United States Patent [19]

Yoshida et al.

[11] Patent Number: 5,450,279

[45] Date of Patent: Sep. 12, 1995

[54] ELECTRIC DOUBLE LAYER CAPACITOR

[75] Inventors: Akihiko Yoshida, Hirakata; Ichiro Aoki, Ikoma; Seiji Nonaka, Hirakata; Kiyoaki Imoto, Takaishi, all of Japan

[73] Assignee: Matsushita Electric Industrial, Kadoma, Japan

[21] Appl. No.: 213,780

[22] Filed: Mar. 16, 1994

[30] Foreign Application Priority Data

May 19, 1993 [JP] Japan .................................. 5-141514

[51] Int. Cl.⁶ .......................... H01G 9/08; H01G 9/155
[52] U.S. Cl. ..................................... 361/502; 361/517; 361/519; 361/522; 361/541
[58] Field of Search ................ 361/328, 329, 330, 502, 361/522, 541, 517-520, 535-539; 29/25.03

[56] References Cited

U.S. PATENT DOCUMENTS

| | | | |
|---|---|---|---|
| 3,652,902 | 3/1972 | Hart et al. | 361/502 |
| 4,414,607 | 11/1983 | Sekido et al. | |
| 4,713,731 | 12/1987 | Boos et al. | |
| 4,930,045 | 5/1990 | Carlson et al. | 361/329 |
| 5,150,283 | 9/1992 | Yoshida et al. | |

FOREIGN PATENT DOCUMENTS

| | | | |
|---|---|---|---|
| 1136325 | 5/1989 | Japan . | |
| 2-87511 | 3/1990 | Japan | 361/502 |
| 3-83319 | 4/1991 | Japan | 361/502 |
| 3-116708 | 5/1991 | Japan | 361/502 |
| 3-173111 | 7/1991 | Japan | 361/502 |
| 3-173112 | 7/1991 | Japan | 361/502 |
| 46760 | 1/1992 | Japan . | |
| 4-206809 | 7/1992 | Japan | 361/502 |

OTHER PUBLICATIONS

Patent Abstracts of Japan, vol. 16, No. 441, (E-1264) Sep. 14, 1992, JP-A-04 154 106.
Patent Abstracts of Japan, vol. 16, No. 542, (E-1290) Nov. 12, 1992, JP-A-04 206 809.
Patent Abstracts of Japan, vol. 15, No. 365, (E-1111) Sep. 13, 1991, JP-A-03 142 811.
Patent Abstracts of Japan, Vol. 17, No. 71, (E-1319) Feb. 12, 1993, JP-A-04 274 311.
Patent Abstracts of Japan, vol. 13, No. 168, (E-747) Apr. 21, 1989, JP-A-64 001 222.

*Primary Examiner*—Bruce A. Reynolds
*Assistant Examiner*—Gregory L. Mills
*Attorney, Agent, or Firm*—Cushman, Darby & Cushman

[57] ABSTRACT

An electric double layer capacitor having a rectangular cross-section for an excellent volumetric efficiency and a low internal resistance is disclosed. The capacitor comprises a plurality of sheet-like current collectors in one polarity and in the other polarity; the surfaces of the both collectors are formed into polarizable electrodes composed mainly of activated carbon with a binder; a plurality of separators interposed between the current collectors of the one polarity and those of the other polarity.

7 Claims, 4 Drawing Sheets

ELECTRIC DOUBLE LAYER CAPACITOR

BACKGROUND OF THE INVENTION

1. Field of the Invention

The present invention relates to electric double layer capacitors and, in particular, to such capacitors that employ activated carbon in their polarizable electrodes.

2. Description of the Related Art

The electric double layer capacitor is a capacitor that utilizes a phenomenon wherein electric energy is stored, in the form of electric charge, in an electric double layer formed at an interface between the polarizable electrode and an electrolyte.

The electric double layer capacitor has a large capacitance for its size and has a wide application as a back-up power source for electronic devices such as microprocessors, electronic memory devices, electronic timers and the like.

Representative arrangements of the conventional electric double layer capacitors are those of cylindrical type as shown in, for instance, the U.S. Pat. No. 5,150,283. In a typical arrangement, a sheet-like current collector of one polarity, whose surfaces are formed into the polarizable electrode composed of activated carbon and a binder, and another sheet-like current collector of the other polarity are wound into a roll by interlaying a separator therebetween. The wound roll is then impregnated with the electrolyte solution, and thereafter housed in a cylindrical container whose open end is sealed with a rubber packing. Lead wires connected to the respective current collectors are drawn out of the container by piercing through the rubber packing.

The above-mentioned cylindrical electric double layer capacitor has a high capacitance density, i.e., a large capacitance for its unit volume. However, the cylindrical capacitor sometimes has an insufficient volumetric efficiency when it is installed in certain electronic appliances. When arranging a plurality of the cylindrical capacitors in serial or parallel connection for securing a large capacitance or a high working voltage, a plurality of dead spaces are inevitably created between the laterally aligned capacitors, thereby resulting a large total dead space and considerably deteriorating volumetric efficiency.

In addition, in the above-discussed conventional electric double layer capacitor, the lead wires are electrically connected to only small spots of the current collectors in a long belt shape. Therefore, the conventional electric double layer capacitor has a disadvantage that an impedance at the lead wire part is large. Usually, the electric double layer capacitor comprising activated carbon is employed where a large current such as from 100 A to 1,000, is required for a time period of lasting from several seconds to several tens seconds. In that case, the lead wire parts are required to have a low impedance. In contrast to this, in case of an aluminum electrolytic capacitor, the time during which a large current is flown is limited to only a range of several micro seconds to several milliseconds, and hence, the decreases in the impedance at its lead wire parts are not so necessary as in the case of the electric double layer capacitor.

In order to decrease the impedance in the lead wire parts, the number of the lead wires must be increased in the conventional capacitors of the above-mentioned structure, but increasing the number of the lead wires is difficult to realize due to the structure of such capacitors.

SUMMARY OF THE INVENTION

It is therefore an object of the present invention to provide an electric double layer capacitor having an excellent volumetric efficiency and a decreased impedance at its lead wire parts.

The present invention provides an electric double layer capacitor, wherein a plurality of unit cells are connected in parallel, comprising a plurality of sheet-like current collectors having a first polarity, whose surfaces are formed into polarizable electrodes composed mainly of activated carbon with a binder, a plurality of sheet-like current collectors having a second polarity, whose surfaces are formed into polarizable electrodes composed mainly of activated carbon with a binder, a plurality of separators interposed between the first-mentioned and the second-mentioned plurality of sheet-like current collectors, to form a laminated body, an electrolyte which is in contact with both the polarizable electrodes, an exterior component having a rectangular cross-section which accommodates the laminated body, a first lead conductor which is electrically connected to the current collectors of the first polarity, and a second lead conductor which is electrically connected to the current collectors of the second polarity.

Further, the present invention also provides an electric double layer capacitor, wherein a plurality of unit cells are connected in series, comprising a plurality of sheet-like current collectors whose surfaces are formed into polarizable electrodes composed mainly of activated carbon with a binder, a plurality of separators interposed between the plurality of sheet-like current collectors, to form a laminated body, an electrolyte which is in contact with the polarizable electrodes, an exterior component having a rectangular cross-section which accommodates the laminated body, a first lead conductor which is electrically connected to the current collector positioned at one end of the laminated body, and a second lead conductor which is electrically connected to the current collector positioned at the other end of the laminated body.

In a preferred embodiment of the present invention, the separators bag-like structures each enclosing each of said current collectors whose both surfaces are formed into the polarizable electrodes and having an open end whose edge is connected to be closed near the end part of each of the current collectors.

In a preferred embodiment of the present invention, the exterior component is composed of a rectangular parallelepiped container and a lid which fits to the container. In another preferred embodiment of the present invention, the exterior component is made of a resin which is molded on an outer periphery of the laminated body composed of the current collectors carrying the polarizable electrodes and the separators.

It is preferable for a current drawing-out lead part of each of the current collectors to utilize at least half of the width of the part on which the polarizable electrodes are formed. Each of the current collectors comprises, the current drawing-out part for connecting to the lead conductors, in-addition to the part whose surfaces are formed into the polarizable electrodes.

In a preferred embodiment of the electric double layer capacitor in accordance with the present invention, wherein the plurality of the unit cells are connected in series, each of peripheries of the current collectors is connected to the exterior component in a liquid tight fashion.

In the above-mentioned electric double layer capacitor, each of peripheries of the current collectors may be fitted in a groove provided on an inner face of the exterior component and a part around the groove is sealed with an adhesive agent in a liquid tight fashion.

In another preferred embodiment, each of peripheries of the current collectors is embedded in the exterior component prepared by resin molding.

These and other advantages of the present invention will be understood clearly to those skilled in the art, from the following detailed description taken in connection with the accompanying drawings.

Figure 1:
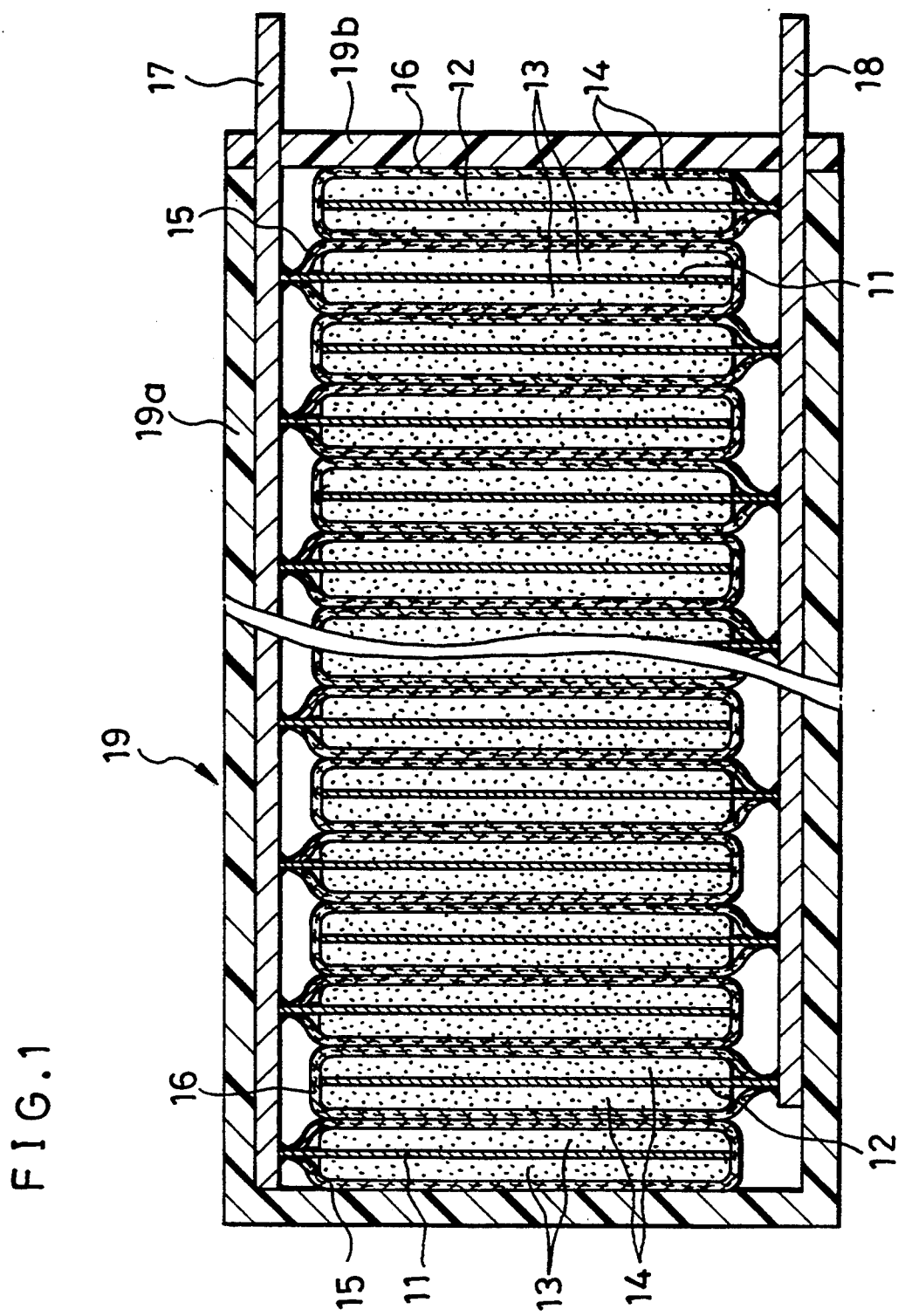
FIG. 1 is a cross-sectional side view showing an electric double layer capacitor built in accordance with one embodiment of the present invention.

It will be recognized that some or all of the Figures are schematic representations for purposes of illustration and do not necessarily depict the actual relative sizes or locations of the elements shown.

DETAILED DESCRIPTION OF THE INVENTION

The present invention provides an electric double layer capacitor having a rectangular outer shape and a large capacitance wherein a plurality of unit cells are connected in parallel, and another electric double layer capacitor having a rectangular outer shape and a high working voltage wherein a plurality of unit cells are connected in series.

It is of course possible to connect the capacitors each having a parallel connection structure further in series, and to connect the capacitors each having a series connection structure further in parallel.

In embodying the present invention, it is possible to use activated carbon made from petroleum pitch, activated carbon made from phenolic resin or, activated carbon made from coconut shell and the like. The activated carbon may be in a powder or a fiber state.

The binder for combining the respective particles of activated carbon in the powder or the fiber state to one another and for bonding the combined body to the current collectors may be exemplified as cellulose derivatives of carboxymethyl cellulose, hydroxypropyl cellulose or the like, polysaccharides including starch and chitin, arginic acid, chitosan, or their derivatives or their salts.

It is further possible to employ any thermoplastic resin such as vinyl chloride resin, vinylidene chloride resin, polyethylene, polypropylene, polystyrene, ABS resin, fluorocarbon resin, nylon, and a copolymer resin of styrene-acrylonitrile, or any thermosetting resin such as melamine resin and epoxy resin, as the binder.

The binder is suitably selected from those materials in compliance with the electrolyte actually employed in the electric double layer capacitor. That is, in a case of employing an alkaline aqueous solution as the electrolyte, a binder having an alkaline resistivity is selected; and in a case of employing an organic electrolyte, a binder having a certain resistivity against the organic electrolyte is selected.

In addition to the above-mentioned activated carbon and binder, the polarizable electrode may contain a conductive agent for improving the electric conductivity, such as carbon black.

As the current collector whose surfaces are both formed into the polarizable electrodes, various metals may be employed as far as they have a certain resistivity against the electrolyte. In cases of employing the organic electrolyte, aluminum is the most preferred. Any other metals having a valve action such as titanium and tantalum may be employed. On the other hand, nickel is suitable in a case of employing an alkaline aqueous electrolyte. Carbon sheets or foils are suitable in both cases.

As the alkaline electrolyte, an aqueous solution of potassium hydroxide is generally employed. Since the electrolyte of an aqueous solution has a high conductivity, it gives a cell with a low internal resistance.

The organic electrolyte may be prepared by dissolving an electrolyte salt such as tetraethylammonium tetrafluoroborate or tetraethylammonium perchlorate in an organic solvent such as propylene carbonate or $\gamma$-butyrolactone. In cases of employing the organic electrolyte, the working voltage is increased by two or three times as compared with the cases of employing the aqueous electrolyte, and hence it is possible to obtain an electric double layer capacitor having a high energy density.

The present invention may be further understood by reference to the following non-limiting examples shown in the accompanying drawings.

EXAMPLE 1

Figure 2:
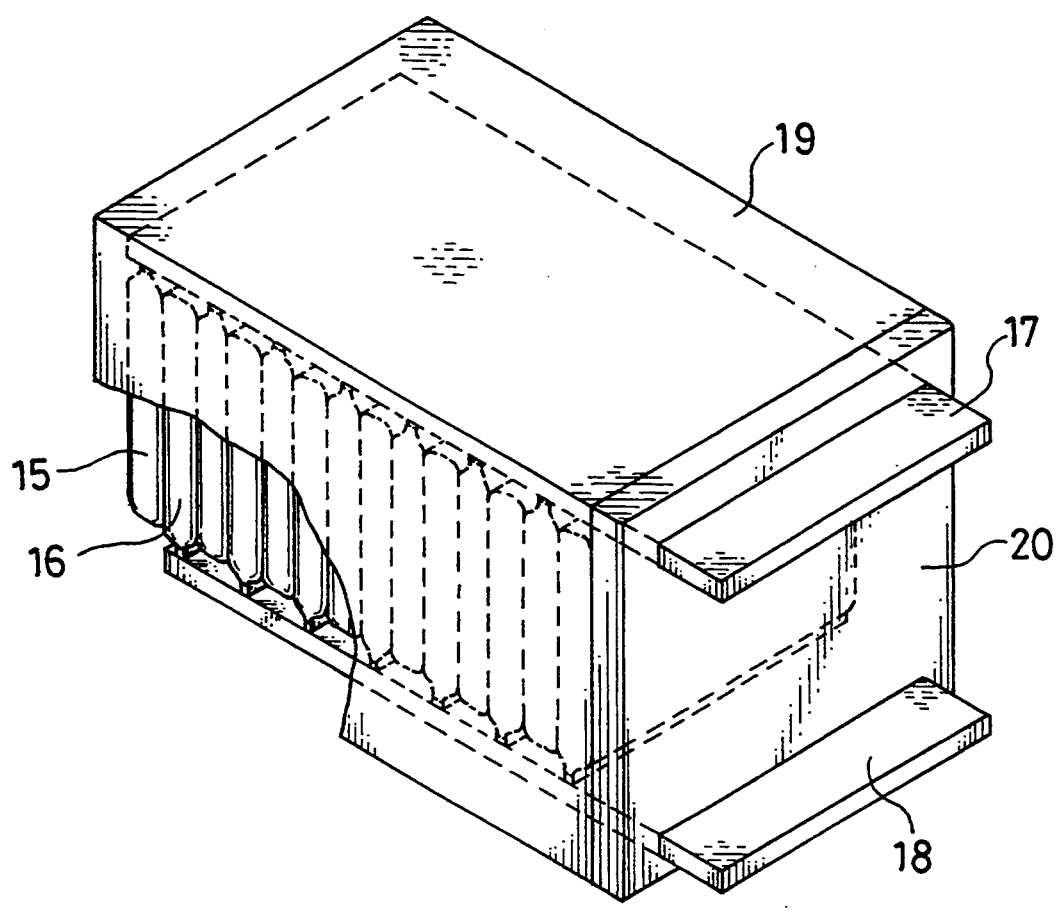
FIG. 2 is a partly cut-out perspective view showing the electric double layer capacitor shown in FIG. 1.

An electric double layer capacitor built in accordance with this example is shown in FIG. 1 and FIG. 2. In these Figures, a reference numeral 11 designates current collectors having a first polarity, for instance cathode side, and are made of aluminum foil with a size of 110 mm $\times$ 110 mm and a thickness of 10 $\mu$m whose surfaces are electrolytically polished. On the surface of both sides of the current collectors 11, polarizable electrodes 13 are provided in the following manner. First, a paste 1s prepared by adding 100 g of activated carbon made from phenolic resin (specific surface area: 2000 m$^2$/g) to an aqueous solution obtained by dissolving 10 g of carboxymethyl cellulose as the binder in 100 ml of water. Then, this paste is coated on the surfaces of the current collectors 11 for giving a coated region with a size of 100 mm $\times$ 100 mm, and the coated collectors are dried. Thickness of the coated regions is adjusted in a manner to give layers of these polarizable electrodes 13 having a thickness of 100 μm in the dried state on the current collectors.

Separators 15 are made of a micro-porous film of polyethylene. Each of these separators 15 is configured to have a bag-like structure, and each of the above-mentioned current collectors 11 provided with the polarizable electrodes 13 is inserted into this bag-like structure of the separators. Each edge portion of open end of the bag-like separators 15 is adhered by fusion to each surface of exposed parts of the current collectors 11.

Current collectors 12 having a second polarity, i.e., in the anode side, are also made of aluminum foil, whose surfaces are electrolytically polished and provided with polarizable electrodes 14 composed of the activated carbon with the binder and are then enclosed in separators 16 in bag-like structure, in a similar manner as in the current collectors 11. Each edge portion of open end of the bag-like separators 16 is adhered by fusion to each surface of exposed parts of the current collectors 12.

Each of the above-mentioned current collectors 11 and 12 with the separators 15 and 16 is alternately stacked with each other to form a laminated body, in a manner that end parts of the current collectors 11 exposed from the separators 15 are at top of the laminated body, and conversely, end parts of the current collectors 12 exposed from the separators 16 are at bottom of the laminated body. At the top of the laminated body, the end parts of the current collectors 11 are upwardly projected, and the projected parts are connected to a first lead conductor 17 made of aluminum sheet by spot-welding at a plurality of positions. Further, the end parts of the current collectors 12 downwardly projected from the laminated body are connected to a second lead conductor 18 made of aluminum sheet in a similar manner. The widths of these lead conductors 17 and 18 are equal to those of the current collectors 11 and 12.

The above-mentioned laminated body is then inserted into a box-type container 19a. After putting an electrolyte prepared by dissolving tetraethylammonium tetrafluoroborate in propylene carbonate in 0.1 mole/lit. into the container 19a, open end of the container 19a is sealed with a lid 19b which has through holes for permitting the lead conductors 17 and 18 to be drawn out.

In the above-mentioned manner, an electric double layer capacitor is assembled. In the thus assembled capacitor, seventeen (17) units of the current collectors 11 provided with the polarizable electrodes 13 and the current collectors 12 provided with the polarizable electrodes 14 are alternately stacked interlaying the separators 15 and 16. And the whole members are enclosed in an exterior component 19 of a rectangular cross-section composed of the container 19a and the lid 19b. In this electric double layer capacitor, a unit cell is configured between any two of the adjacent current collectors 11 and 12 by the polarizable electrodes 13 and 14 which face with each other intermediating the separators 15 and 16, respectively. By thus connecting the thirty-three (33) unit cells in parallel, a capacitor having a large capacitance is obtained.

Further, since aluminum sheets having a larger thickness than that of the current collectors 11 and 12 are employed as the lead conductors 17 and 18, electric resistances in the lead conductors are small. In addition, since a configuration that the end parts of the current collectors 11 and 12 are connected to the lead conductors 17 and 18 utilizing their full widths, electric resistances at these connecting parts are also small.

EXAMPLE 2

Figure 3:
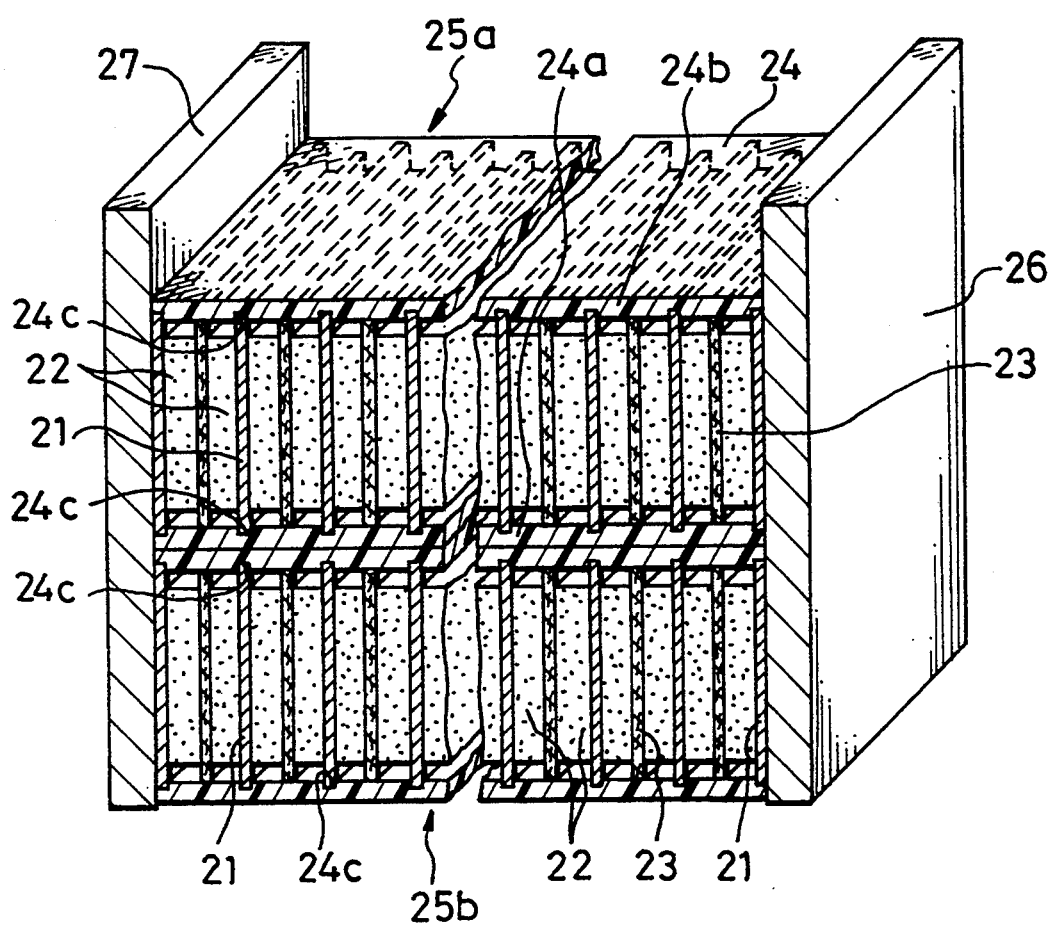
FIG. 3 is a perspective view with a cross-section showing an electric double layer capacitor built in accordance with another embodiment of the present invention.

An electric double layer capacitor built in accordance with this example is shown in FIG. 3. Each of the current collectors 21 is made of aluminum foil having a size of 120 mm×120 mm and a thickness of 10 μm, and polarizable electrodes 22 having a size of 100 mm×100 mm and a thickness of 100 μm are formed on surfaces of the both sides of the current collectors 21. Parts of the current collectors 21, on which the polarizable electrodes 22 are formed, are finished to be uneven by means of embossing. The polarizable electrodes 22 are formed by coating a paste, prepared by mixing 100 g of activated carbon made from coconut shell (specific surface area: 1,800 $m^2/g$) with 120 ml of an aqueous solution of acetic acid (1% by weight) which also dissolves 10 g of chitosan as the binder, on the surfaces of the current collectors and then drying the coated collectors.

Seventeen (17) sheets of the above-mentioned current collectors 21 are stacked together, interlaying separators 23 therebetween, and by inserting a laminated body thus obtained into an exterior component 24 with its right end and left end both open; and thus a cell assembly 25a is configured. In this structure, the current collectors 21 positioned at the both ends of the cell assembly 25a have one polarizable electrode only on their one side face.

In the cell assembly 25a, a unit cell is configured with a pair of polarizable electrodes 22 which are facing with each other through one of the separators, between the adjacent current collectors 21, and sixteen (16) of such unit cells are connected in series. In other words, with the exception of the current collectors positioned at the both end of the cell assembly 25a, each of the other current collectors 21 functions as a bipolar electrode playing a role of connecting the adjacent unit cells together. Each of such current collectors 21 also plays a role of isolating the electrolytes contained in the unit cells of its both side. Therefore, in this example, the peripheries of the current collectors 21 are embedded in the material of an exterior component 24.

In this example, the separators 23 is made of microporous film of glass fiber-blended paper. The electrolyte comprises a propylene carbonate solution which dissolves tetraethylammonium tetrafluoroborate in 0.1 mol/lit.

Reference numeral 25b designates a cell assembly which is configured in the same manner as the above-mentioned cell assembly 25a. These two cell assemblies 25a and 25b are connected together in parallel with a first conductor 26 and a second conductor 27, which are in contact with the current collectors positioned at the both ends of the cell assemblies, thereby providing an electric double layer capacitor having a high working voltage and a large capacitance. By further stacking similar cell assemblies together, it is possible to obtain a capacitor of a larger capacitance.

In the following paragraphs, an exemplified manner for producing the above-mentioned cell assembly 25a will be described.

The exterior component 24 with its right and left ends open comprises a container 24a having a U-cross-section with its right and left ends open as well as its top face open, and a lid 24b which closes the top face of the container 24a. Inner wall faces of the container 24a and the lid 24b are provided with a plurality of grooves 24c each of which accommodates each of the edges of the current collectors 21. After filling the grooves 24c formed on the inner wall face of the container 24a with an adhesive agent, and inserting the laminated body into the container 24a, the edges of the current collectors 21 are fitted in the grooves 24c. Then the polarizable electrodes 22 and separators 23 are impregnated with the electrolyte. Thereafter, by closing the top open face of the container 24a with the lid 24b, the upper ends of the current collectors 21 are fitted in the grooves 24c provided on the inner wall face of the lid 24b.

In the above-mentioned manner, the electric double layer capacitor is configured such that the adjacent unit cells are liquid-tightly isolated and electrically connected in series with each other.

In another mode of configuring the cell assembly 25a, the exterior component is produced by molding a resin on the outer periphery of the laminated body obtained by alternately stacking the current collectors carrying polarizable electrodes on both side thereof and separators, wherein the molding is made such that the one-side or outside faces of the current collectors positioned at the right and left end of the laminated body are exposed.

EXAMPLE 3

Figure 4:
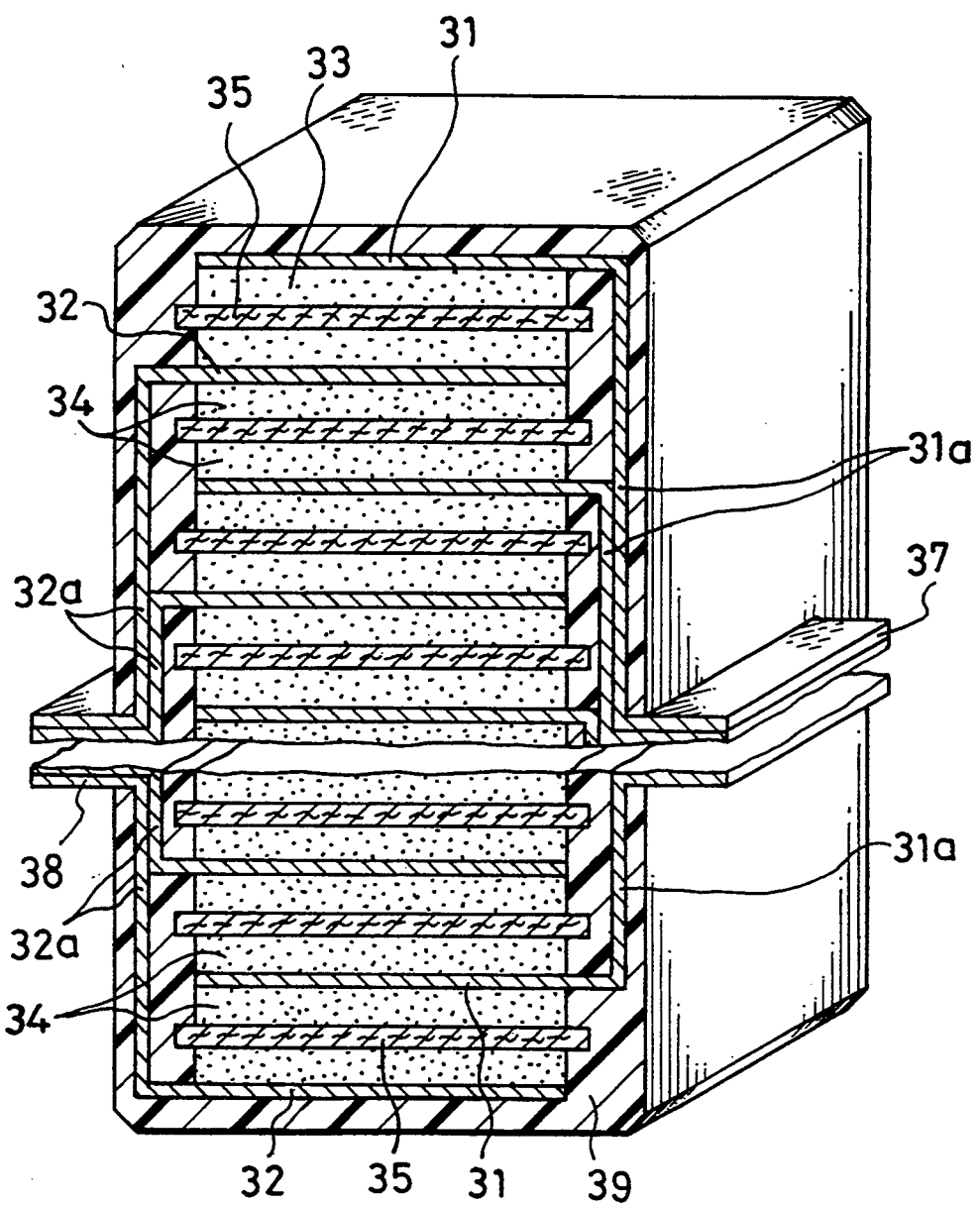
FIG. 4 is a perspective view with a cross-section showing an electric double layer capacitor built in accordance with a further embodiment of the present invention.

An electric double layer capacitor built in accordance with this example is shown in FIG. 4. Each of current collectors 31 and 32 is made of aluminum foil, and polarizable electrodes 33 and 34 composed of an activated carbon with a binder are formed on surfaces of the both sides of the current collectors. The current collectors 31 are alternately stacked on the current collectors 33 interlaying separators 35 therebetween to form a laminated body. The above-mentioned polarizable electrodes 33 and 34 are formed by coating a paste, prepared by mixing 100 g of activated carbon made from petroleum pitch (specific surface area: 1,800 m$^2$/g) with 70 ml of an aqueous solution containing 10 g of hydroxypropyl cellulose as the binder, on the surfaces of the current collectors and then drying the coated collectors. Each of the polarizable electrodes has a size of 100 mm×100 mm and a thickness of 100 μm. The separators 35 are made of glass fiber-blended paper.

The sizes of the stacked parts of the current collectors 31 and 32 are 110 mm×110 mm, respectively, but the current collectors 31 and 32 respectively extend outwardly in the opposite directions and current lead out parts 31a and 32a are integrally formed on the extended parts. By welding each set of these lead out parts 31a and 32a together into a unitary body, a lead conductor 37 of one polarity and a lead conductor 38 of the other polarity are formed, respectively.

After impregnating the above-mentioned laminated body with an electrolyte composed of a propylene carbonate solution which dissolves tetraethylammonium tetrafluoroborate in 0.1 mol/lit., an exterior component 39 being made of polypropylene and having a rectangular cross-section is formed on the periphery of the laminated body by resin molding.

In the above-mentioned manner, the electric double layer capacitor having a large capacitance is configured. In this capacitor, seventeen (17) sheets of the current collectors 31 carrying the polarizable electrodes 33 and the same numbers of the current collectors 32 carrying the polarizable electrodes 34 are alternately stacked together, interlaying the separators 35 therebetween, thereby connecting thirty three (33) unit cells together in parallel.

Characteristics of the electric double layer capacitors built in accordance with each of the above-mentioned examples and that of the conventional example are compared and the results of the comparison are summarized in Table 1 below. In this comparison, an electric double layer capacitor which will be mentioned below is tested as a comparative example. The capacitor of the comparative example is produced by winding a pair of long belt-like current collectors, which is made of aluminum foil and carrying polarizable electrodes on both faces thereof interlaying a separator, into a roll, and then by enclosing the wound body in a cylindrical container. Internal resistances of the capacitors are represented by impedance values at 120 Hz.

TABLE 1

|  | Capacitance (F) | Energy density (J/cc) | Internal resistance (mΩ) |
| --- | --- | --- | --- |
| Example 1 | 100 | 12 | 10 |
| Example 2 | 200 | 12 | 5 |
| Example 3 | 100 | 12 | 8 |
| Comparative example | 100 | 6 | 50 |

Although the foregoing description is limited to the embodiments of specific configurations, various improvements and alterations in the configuration is of course possible. For instance, although the exterior component 19 in Example 1 is composed of the container 19a and the lid 19b, this may also be formed by resin molding. Further, although the lead conductors 17 and 18 having the same width as those of the current collectors 11 and 12 are employed, the width of the lead conductors 17 and 18 may be made as small as half of the current collectors 11 and 12. In that case, the width of the parts of the current collectors that are connected to the lead conductors may also be made small to the same extent. However, if the width of the parts of the current collectors connected to the lead conductors are small beyond that extent, there arises a disadvantage that the electric resistances at those connecting part are made large.

The sheet-like separators are employed in Example 2 though, the bag-like separators as used in Example 1 may also be employed. In that case, the whole of the current collectors provided with the polarizable electrodes are enclosed one by one in the bag-like separators, and the peripheries of the separators are liquid-tightly fitted or embedded in the grooves provided on the inner wall face of the exterior component.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is

1. An electric double layer capacitor comprising:
    a plurality of sheet-like current collectors whose surfaces are formed into polarizable electrodes composed mainly of activated carbon with a binder;
    a plurality of separators interposed between the plurality of sheet-like current collectors, which together with the sheet-like current collectors form a laminated body;

an electrolyte which is in contact with the polarizable electrodes;

an exterior component having a rectangular cross-section which accommodates the laminated body, the exterior component including a one-piece member provided along one side of the laminated body, the one-piece member having grooves defined therein to receive peripheral edge portions of the sheet like current reflector therein;

a first lead conductor which is electrically connected to the current collector positioned at one end of the laminated body; and a second lead conductor which is electrically connected to the current collector positioned at another end of the laminated body.

2. The electric double layer capacitor in accordance with claim 1, wherein each peripheral edge portion of the current collectors is connected to the exterior component in a liquid tight fashion.

3. The electric double layer capacitor in accordance with claim 2, wherein each of the peripheral edge portions of the current collectors is fitted in the groove, wherein the groove is provided on an inner face of the one-piece member and sealed thereto in a liquid-tight fashion via an adhesive.

4. The electric double layer capacitor in accordance with claim 2, wherein the exterior component is made of a resin which is molded on an outer periphery of the laminated body composed of the current collectors carrying the polarizable electrodes and the separators, and each of peripheries of the current collectors is embedded in the resin.

5. An electric double layer capacitor comprising:
a plurality of sheet-like current collectors whose surfaces are formed into polarizable electrodes composed mainly of activated carbon with a binder;

a plurality of separators interposed between the plurality of sheet-like current collectors, to form a laminated body;

an electrolyte which is in contact with the polarizable electrodes;

an exterior component having a rectangular cross-section which accommodates the laminated body;

a first lead conductor which is electrically connected to the current collector positioned at one end of the laminated body, wherein each of the peripheral edge portions of the current collectors is fitted in a groove provided on an inner face of the exterior component and sealed thereto in a liquid-tight fashion via an adhesive; and a second lead conductor which is electrically connected to the current collector positioned at the other end of the laminated body.

6. The electric double layer capacitor in accordance with any one of claims 1, 2, 3, 4 or 5, wherein the electrolyte is an organic electrolyte and the current collectors are made of aluminum or carbon.

7. The electric double layer capacitor in accordance with any one of claims 1, 2, 3, 4, or 5, wherein the electrolyte is an alkaline aqueous solution and the current collectors are made of nickel or carbon.

* * * * *

UNITED STATES PATENT AND TRADEMARK OFFICE
CERTIFICATE OF CORRECTION

PATENT NO. : 5,450,279
DATED : SEPTEMBER 12, 1995
INVENTOR(S) : YOSHIDA et al

It is certified that error appears in the above-indentified patent and that said Letters Patent is hereby corrected as shown below:

Please change: On the title page, item

"[73] Assignee: Matsushita Electric Industrial, Kadoma, Japan"

to

-- [73] Assignee: Matsushita Electric Industrial Co., Ltd., Kadoma, Japan --

Signed and Sealed this

First Day of October, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.    :    5,450,279
DATED         :    SEPTEMBER 12, 1995
INVENTOR(S)   :    YOSHIDA et al

It is certified that error appears in the above-identified patent and that said Letters Patent is hereby corrected as shown below:

On title page, change,

"[73] Assignee: Matsushita Electric Industrial, Kadoma, Japan"

to

-- [73] Assignee: Matsushita Electric Industrial Co., Ltd., Kadoma, Japan --

Signed and Sealed this

Twenty-first Day of April, 1998

Attest:

BRUCE LEHMAN

*Attesting Officer*          *Commissioner of Patents and Trademarks*